ELECTROPHOTOGRAPHIC LIGHT-SENSITIVE MATERIAL

Mitsuru Hashimoto, Tokyo, Japan, assignor to Ricoh Co., Ltd., Tokyo, Japan
No Drawing. Filed Dec. 7, 1972, Ser. No. 312,942
Claims priority, application Japan, Dec. 27, 1971, 47/105,237
Int. Cl. E01c 1/00
U.S. Cl. 96—1.5                      5 Claims

ABSTRACT OF THE DISCLOSURE

An electrophotographic light-sensitive material having a photoconductive layer formed on an electroconductive support, the photoconductive layer comprising an organic photoconductive polymer sensitized with a 2-aza-9-fluorenone derivative.

BACKGROUND OF THE INVENTION

Electrophotographic light-sensitive materials comprise electroconductive supports with a photoconductive layer formed thereon. The principle of an electrophotographic process is that an electrostatic latent image is produced by image-wise exposure of a charged photoconductive layer and the image is then developed by a developer or toner (in liquid or powder form) which is electrically precipitated on the latent image to form a visible image. Conventionally, for forming the photoconductive layer, inorganic photoconductors such as photoconductive zinc oxide or selenium are used. Recently, the use of an organic photoconductor i.e. a photoconductive polymer such as poly-N-vinylcarbazole in place of the inorganic photoconductor has been proposed. Among the advantages of photoconductive polymers are transparency and mechanical flexibility. Additionally, they are easy to form into photoconductive layers. On the other hand, they absorb light in the ultraviolet region of the spectrum, but are not sensitive to visible light. To overcome this disadvantage, i.e. to shift their absorption into the visible region of the spectrum, dyestuff sensitizers are added to the organic photoconductors. Such dyestuffs as have been previously employed are generally not stable and bleach out quickly so that the photoconductive polymers lose their sensitivity in the visible region. As a result, electrophotographic light-sensitive materials prepared utilizing photoconductive polymers containing dyestuff sensitizers are of limited practical use.

It is, therefore, an object of the present invention to provide an improved electrophotographic light-sensitive material containing a stable sensitizer.

SUMMARY OF THE INVENTION

The present invention relates to electrophotographic light-sensitive materials having organic photoconductive layers formed on an electroconductive layer conductive support. The organic photoconductive composition comprises an organic photoconductive polymer together with at least one 2-aza-9-fluorenone derivative.

It has been found that the light absorption of photoconductive polymers can be shifted from the ultraviolet region of the spectrum into the visible region by adding from about 0.1 to about 1.3 moles of at least one 2-aza-9-fluorenone derivative per monomeric unit of photoconductive polymer to the photoconductive polymer. It has been additionally observed that electrophotographic light-sensitive materials containing such 2-aza-9-fluorenone derivatives have longer shelf life in comparison with similar materials sensitized with conventional dyestuffs.

When the sensitizer is used in a quantity of less than about 0.1 mole per monomeric unit of photoconductive polymer, there is substantially decreased enhancement in the ability of the photoconductive polymer to absorb visible light. There is little advantage to be realized by utilizing the sensitizer at a concentration of more than about 1.3 moles per monomeric unit of photoconductive polymer.

The 2-aza-9-fluorenone derivatives useful in this invention may be represented by the following general formula:

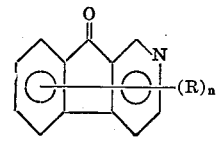

wherein R represents a methyl, carboxyl or nitro group and $n$ is an integer of from 1 to 3.

Preferred 2-aza-fluorenone derivatives include 2-aza-3-carboxy-9-fluorenone, 2-aza-1,3-dimethyl-9-fluorenone, 2-aza-1,3-dicarboxyl-9-fluorenone, 2-aza-1,3,4-tricarboxy-9-fluorenone, 2-aza-3-methyl-7-nitro-9-fluorenone, 2-aza-7-nitro-9-fluorenone, 2-aza-5,7-dinitro-9-fluorenone, 2-aza-3,5,7-trinitro-9-fluorenone and the like. Of these, the most preferred 2-aza-9-fluorenone derivatives are 2-aza-3,5,7-trinitro-9-fluorenone, 2-aza-5,7-dinitro-9-fluorenone and 2-aza-7-nitro-9-fluorenone because of their improved sensitivity and the excellent results obtained with compositions containing one or more of them.

The 2-aza-9-fluorenone derivatives useful in this invention can be prepared by known methods. For example, 2-aza-7-nitro-9-fluorenone can be synthesized as follows:

A solution of 4.2 g. of 2-aza-9-fluorenone in 60 ml. of glacial acetic acid is added dropwise to a mixed acid containing 90 ml. of fuming nitro acid (S.G. 1.52) and 67.5 ml. of conc. sulfuric acid (S.G. 1.8) at temperatures of 5° C.–20° C. After heating at 90° C. for 1 hour with stirring, the mixture is poured into 700 ml. of ice water and neutralized with 30% aqueous solution of sodium hydroxide. The precipitate formed is filtered and washed with water. It is recrystallized from dioxane (about 200 ml.) to provide 4.8 g. of 2-aza-7-nitro-9-fluorenone (M.P. 208° C.) in the form of yellow-brownish needle-like crystals.

Photoconductive polymers suitable for use in the present invention include, for example, poly-N-vinylcarbazole, chlorinated or brominated poly-N-vinylcarbazole, polyvinylpyrene, poly-1-arylimidazole, polyvinylnaphthalene, polyvinylanthracene, poly-9-vinylfluorene, poly-p-phenylene-1,3,4-oxadiazole, polypyromellitimide, poly-3-vinylphenanthrene, poly-2-vinyldibenzothiophene and anthracene-formaldehyde resin.

Other organic photoconductors which may be used in the electrophotographic light-sensitive material of the invention include N-ethylcarbazole, N-vinylcarbazole, anthracene, pyrene and 2,3-diphenyl-indolizine.

Electroconductive supports suitable for use in the present invention include, for example, metallic sheets such as aluminum foil or thin films such as polyester resin sheets coated with a thin layer of aluminum.

In the presently preferred process for preparing the electrophotographic light-sensitive products of the present invention, the selected photoconductive polymer and 2-aza-9-fluorenone derivative are dissolved in a solvent such as tetrahydrofuran or dioxane. Various fillters such as novolak resin or acrylic resin also may be added to enhance the properties of the photoconductive layer in accordance with conventional practice. The solution obtained is coated on a surface of the electroconductive support, for example, by means of a doctor blade set and then dried.

The following nonlimiting examples are given by way of illustration only.

EXAMPLE 1

A solution was prepared from the following ingredients:

Poly-N-vinylcarbazole _____ 643 mg. (3.3 m. mole).
2-aza-7-nitro-9-fluorenone ____ 75 mg. (0.33 m. mole).
Polychlorobiphenyl (10% solution in tetrahydrofuran) ___ 1 g.
Tetrahydrofuran _____ 10 g.

This solution was coated on an aluminum layer on a polyester resin film (thickness: 75μ), using a doctor blade set at a 200μ gap and then dried at a temperature of 60° C. for 10 minutes. The aluminum layer can be formed on a surface of polyester resin film by vacuum evaporation. A photoconductive layer having a thickness of about 7μ was formed on the aluminum layer.

The sensitivity of the electrophotographic light-sensitive material thus obtained was evaluated as follows:

The photoconductive layer was positively or negatively charged by a corona discharge of about 6 kv. and a surface electric potential of about 1080 v. was obtained. In this charged light-sensitive material, an amount of exposure E½ (lux. sec.) was measured by using a tungsten incandescent lamp and a rotary sector type electrometer, said E½ being an amount of exposure by which a surface electric potential is reduced to about 540 v. (half of the initial potential). This E½ was about 40 lux.sec. and this value represents the sensitivity of the electrophotographic light-sensitive material. The lower the value of E½, the higher the sensitivity of the light-sensitive material.

EXAMPLE 2

An electrophotographic light-sensitive material was obtained by repeating the same procedure as that of Example 1 except that a large quantity of 2-aza-7-nitro-9-fluorenone was used as follows:

Poly-N-vinylcarbazole _____ 643 mg. (3.3 m. moles).
2-aza-7-nitro-9-fluorenone ____ 750 mg. (3.3 m. moles).
Polychlorobiphenyl (10% solution in tetrahydrofuran) ___ 1 g.
Tetrahydrofuran _____ 10 g.

The electrophotographic light-sensitive material obtained had an E½ value of 25 lux.sec.

EXAMPLE 3–EXAMPLE 12

Electrophotographic light-sensitive materials were obtained by repeating the same procedure as that of Example 1 except that the following organic photoconductive polymers and sensitizers were respectively used in place of those of Example 1.

The electrophotographic light-sensitive materials obtained gave respectively the values of E½ as follows:

| Ex. No. | Photoconductive polymer | Sensitizer, 2-aza-9-fluorenone derivative | Sensitivity, E½ (lux sec.) |
|---|---|---|---|
| 3 | Poly-3-vinylphenathrene, 680 mg. (3.3 m. mole). | 2-aza-7-nitro-9-fluorenone, 750 mg. (3.3 m. mole). | 20 |
| 4 | Poly-N-vinylcarbazole, 643 mg. (3.3 m. mole). | 2-aza-3,5,7-trinitro-9-fluorenone, 1,080 mg. (3.3 m. mole). | 5 |
| 5 | Poly-3,6-dibromo-N-vinylcarbazole, 1,170 mg. (3.3 m. mole). | 2-aza-5,7-dinitro-9-fluorenone, 903 mg. (3.3 m. mole). | 10 |
| 6 | Poly-3-bromo-N-vinylcarazole, 9.06 mg. (3.3 m. mole). | 2-aza-3-methyl-7-nitro-9-flourenone, 800 mg. (3.3 m. mole). | 50 |
| 7 | Poly-3-chloro-N-vinylcarbazole, 755 mg. (3.3 m. mole). | 2-aza-1,3,4-tricarboxy-9-fluorenone, 1,043 mg. (3.3 m. mole). | 65 |
| 8 | Polyvinylpyrene, 760 mg. (3.3 m. mole). | 2-aza-7-nitro-9-fluorenone, 750 mg. (3.3 m. mole). | 45 |
| 9 | Poly-2-vinyldibenzothiophene, 700 mg. (3.3 m. mole). | 2-aza-7-nitro-9-fluorenone, 750 mg. (3.3 m. mole). | 35 |
| 10 | Poly-N-vinylcarbazole, 643 mg. (3.5 m. mole). | 2-aza-3-carboxy-9-fluorenone, 750 mg. (3.3 m. mole). | 500 |
| 11 | Poly-N-vinylcarbazole, 643 mg. (3.3 m. mole). | 2-aza-5,7-dinitro-9-fluorenone, 900 mg. (3.3 m. mole). | 10 |
| 12 | Poly-N-vinylcarbazole, 643 mg. (3.3 m. mole). | 2-aza-1,3,4-tricarboxy-9-fluorenone, 1,040 mg. (3.3 m. mole). | 70 |

I claim:

1. An electrophotographic light-sensitive material comprising an electroconductive support having a photoconductive layer formed thereon, the photoconductive layer comprising an organic photoconductive polymer and at least one 2-aza-9-fluorenone derivative having the following general formula:

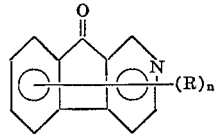

wherein R represents a methyl, carboxyl or nitro group and $n$ is an integer of from 1 to 3.

2. An electrophotographic light-sensitive material according to claim 1 wherein the 2-aza-9-fluorenone derivative is at a concentration of from about 0.1 to about 1.3 moles per monomeric unit of the photoconductive polymer.

3. An electrphotographic light-sensitive material according to claim 1 wherein the 2-aza-9-fluorenone derivative is 2-aza-3,5,7-trinitro-9-fluorenone.

4. An electrophotographic light-sensitive material according to claim 1 wherein the 2-aza-9-fluorenone derivative is 2-aza-5,7-dinitro-9-fluorenone.

5. An electrophotographic light-sensitive material according to claim 1 wherein the 2-aza-9-fluorenone derivative is 2-aza-7-nitro-9-fluorenone.

References Cited

UNITED STATES PATENTS

| | | | |
|---|---|---|---|
| 3,615,412 | 12/1971 | Hessel | 96—1 R |
| 3,661,879 | 5/1972 | Van Dam | 96—1.5 |
| 3,627,524 | 12/1971 | Kinjo et al. | 96—1.6 |
| 3,641,432 | 3/1972 | Holstead | 96—1.6 |

NORMAN G. TORCHIN, Primary Examiner

J. L. GOODROW, Assistant Examiner

U.S. Cl. X.R.

96—1.6